Patented July 18, 1933

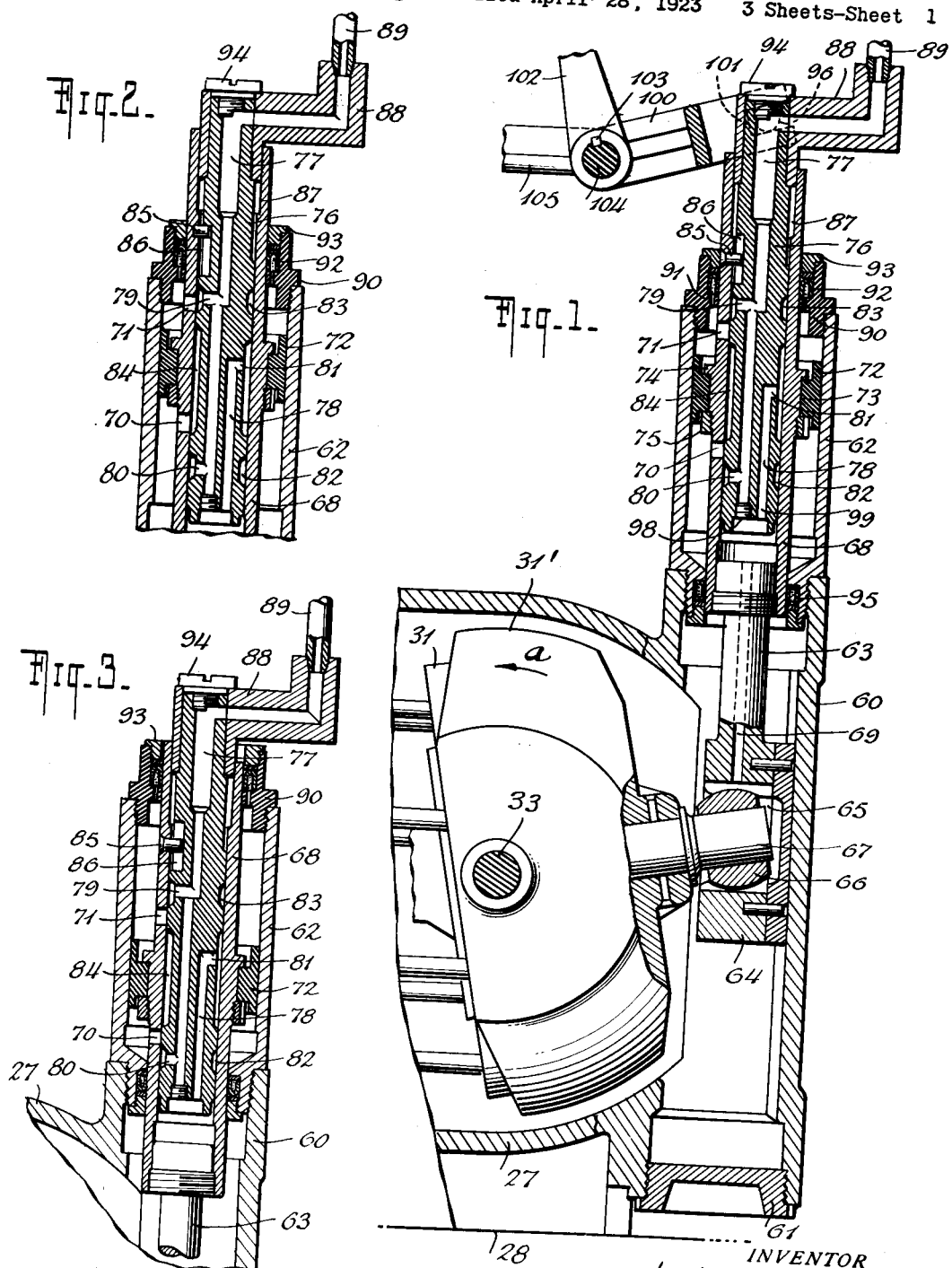

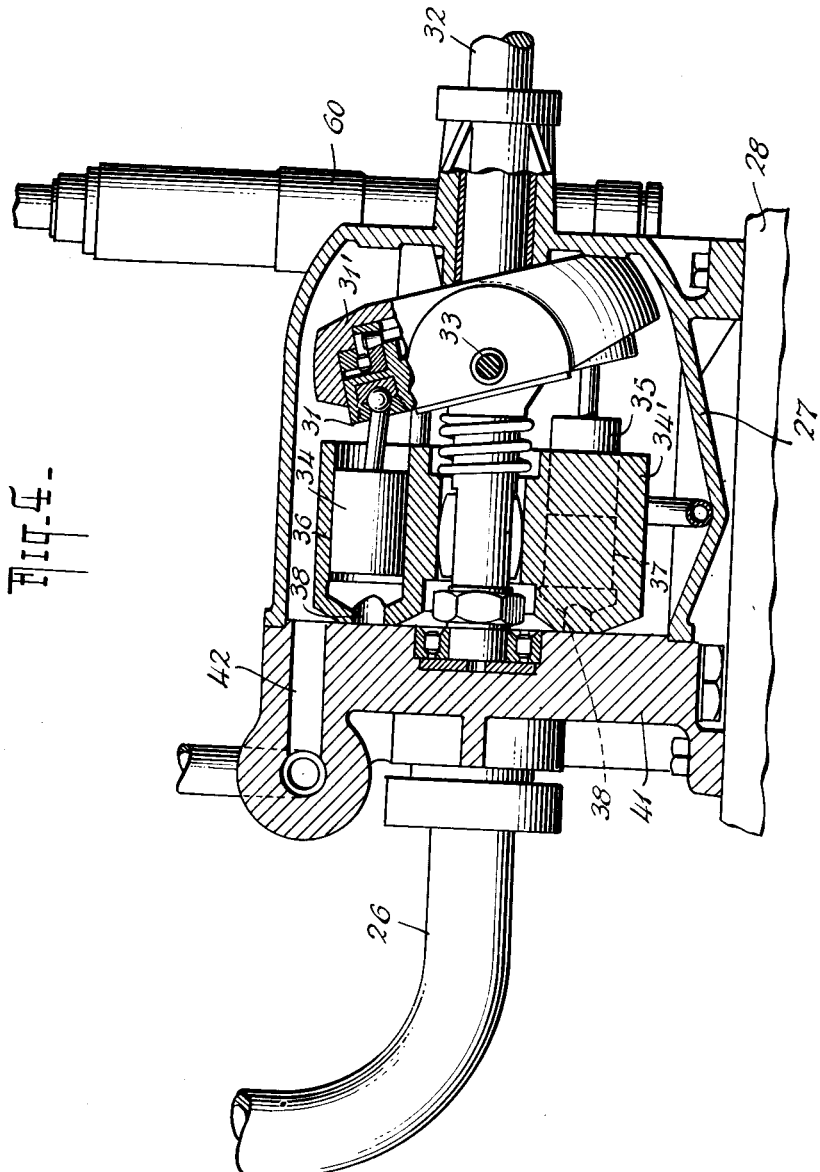

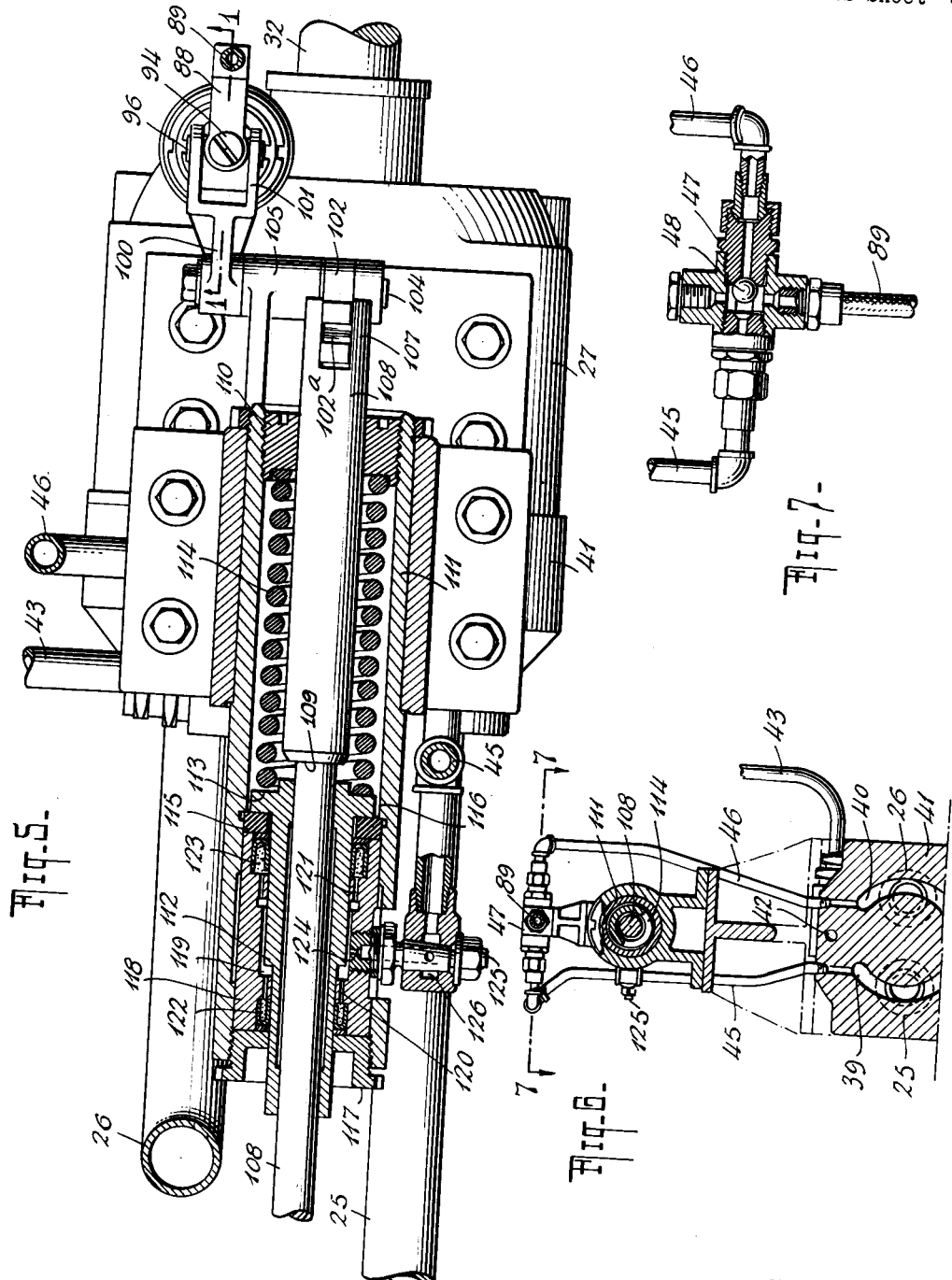

1,918,985

UNITED STATES PATENT OFFICE

JOHN ROBSON, OF CLAREVILLE, CATERHAM VALLEY, ENGLAND, ASSIGNOR TO THE WATERBURY TOOL COMPANY, OF WATERBURY, CONNECTICUT, A CORPORATION OF CONNECTICUT

FLUID CONTROLLED MECHANISM

Original application filed April 28, 1923, Serial No. 635,319, and in Canada June 12, 1924. Divided and this application filed April 10, 1930. Serial No. 443,032.

The invention relates to fluid controlled mechanisms and more particularly to that type thereof which are exemplified by hydraulic variable speed transmissions. In such mechanisms changes in the speed of operation are effected by the adjustment of a so-called swash plate or equivalent element which is adjustable to different positions to bring about the desired variations in operative speed. In many installations the resistance developed against such adjustment operations becomes so great, because of the large size of the parts and for other reasons, that manual actuation to effect the desired speed changes requires considerable effort and in some instances is even impossible of performance.

The object of the invention is to provide a simple and efficient control arrangement whereby the adjustment of the parts to effect the desired speed changes in fluid controlled mechanisms of the type in question may be carried out with a minimum manual effort regardless of any developed resistance thereto. Other more specific objects will appear from the description hereinafter and the features of novelty will be pointed out in the claims. This application is a division of another application filed by me in the United States Patent Office on April 28, 1923, Serial #635,319, issued as Patent #1,760,915 on June 3, 1930.

In the accompanying drawings, which illustrate an example of the invention without defining its limits, Fg. 1 is a vertical section of the device on the line 1—1 of Fig. 5; Figs. 2 and 3 are fragmentary vertical sections showing the parts in different positions; Fig. 4 is a sectional elevation of the pump or A-end of a typical hydraulic variable speed gear with the novel control mechanism combined therewith; Fig. 5 is an enlarged horizontal section of an automatic pressure control mechanism which may form part of the arrangement; Fig. 6 is a vertical section showing the oil pipe connections from the pump to said pressure control mechanism, and Fig. 7 is a section on the line 7—7 of Fig. 6.

While the illustrated example shows a preferred embodiment of the invention in combination with hydraulic variable speed gears of the type known as the Waterbury gear, such as illustrated for instance in United States patents to Janney #924,787 and 1,020,285, it is to be understood that this is not to be construed as defining a limitation of use, as the novel controlling arrangement may be used efficiently with other types of hydraulic speed gears and also with other mechanisms.

Hydraulic variable speed gears of the Waterbury type include a pump or A-end 27 which generally speaking is operatively connected with and controls the operation of a motor or B-end, as shown for instance in the patents above mentioned. The constructional details of the hydraulic speed gear form no part of the present invention, and the drawings accordingly illustrate only so much of the pump or A-end 27 as is necessary to an understanding of the novel control mechanism.

The pump 27 is mounted upon a suitable base 28 and is driven in any suitable manner, as by an ordinary belt drive, or, for example, by means of an electric motor which preferably is of the non-reversing type and is adjusted to operate at a constant speed. The motor or its equivalent is connected with the shaft 32 of the pump or A-end 27 in any conventional manner; the general construction of such pumps and the method of driving the same are well known and require no special illustration.

The oil delivery pump or circulating pump 27 includes a swashplate 31 which may be rotated from the power driven shaft 32 through an intermediate connection of the universal joint character (not shown) as set forth in the Janney patents above referred to. The swashplate 31 rotates in an inclined plane determined by the inclination of the box 31′ adapted to be tilted about a transverse axis 33. A barrel 34′ is held to rotate with the shaft 32, said barrel being provided with a number of cylinders extending lengthwise of the shaft, and containing reciprocating pistons. Two of these pistons are indicated at 34 and 35, and the corresponding cylinders at 36 and 37. Each of the cylinders of the barrel 34' is provided with a reduced port, such as shown at 38 for each of the cylinders 36 and 37, and these cylinder ports are adapted to register alternately, during the rotation of the barrel, with elongated arcuate ports 39 and 40 (Fig. 6) in the end plate 41 of the pump 27, and from which pipes 25 and 26 lead to the co-operating motor or B-end of the hydraulic gear or to equivalent mechanism, for instance as disclosed in the aforesaid Janney patents. According to the direction in which the shaft 32 rotates, and according to the inclination of the swashplate 31, one of the ports will be either the suction port or the delivery port of the pump, the other port being accordingly the delivery port or the suction port of the pump, respectively. The pump casing in the illustrated example includes a port 42 in the end plate 41 which is connected by means of a pipe 43 with an oil reservoir or the like.

The ports 39 and 40 are also connected, by pipes 45 and 46 respectively, with a valve casing 47 (Figs. 6 and 7) containing a ball valve 48. When oil is under pressure in 45 and under suction in 46, the ball valve 48 will become seated toward the right, as shown in Fig. 7, thus closing off pipe 46 from the casing, and vice versa. The interior of the casing 47, and its outlet (connected with a hose 89, as mentioned below) will therefore always communicate with that pump port 39 or 40 which at the time is the pressure port or delivery port.

As described in detail in the prior patents above referred to, the rotation of the swashplate 31 when inclined will cause the pistons to reciprocate in the barrel cylinders, oil from those cylinders in which the pistons are moving toward the end plate 41, being forced out through the corresponding port of the end plate, while oil will be sucked through the other port into those cylinders in which the pistons are moving away from the end plate 41. It will be obvious from Fig. 4 that the rate at which oil is delivered by the pump depends on the length of the piston stroke which in turn is controlled by the angular displacement of the swashplate 31 from the vertical, no oil being pumped or circulated when the said swashplate is in the vertical or neutral position.

In accordance with the embodiment disclosed herein, the rocking of the tilting box 31', for the purpose of varying the output of the pump, or the direction in which it propels the liquid, is accomplished by a combination of mechanical and hydraulically-operated means illustrated by Figs. 1, 2, and 3. This arrangement is as follows:

The pump casing 27 opens at one side into a cylindrical chamber 60 which is closed at its lower end by means of a screw cap 61, and into the upper end of which a cylinder 62 is screwed. A control member or plunger 63 projects within the chamber 60 and terminates in a block 64 one face of which is in contact with the inner surface of the side wall of said chamber 60. The block 64 is hollowed out at 65, providing a socket for a rocking head 66 in which is fitted slidably an arm 67 fastened to the tilting box 31'.

The upper end of the control member or plunger 63 is screwed into the lower end of a cylindrical sleeve or casing chamber 68. The control member or plunger 63 is perforated at 69 throughout its length. The cylindrical sleeve 68 is provided with two ports 70 and 71 communicating with the cylinder 62 surrounding said sleeve 68. An annular piston 72 provided in cylinder 62 surrounds the sleeve 68, and an inwardly projecting rim 73 of this piston is held between and annular rib 74 and a nut 75 provided on the sleeve 68, whereby the said sleeve 68 will be compelled to move lengthwise in unison with the piston 72.

A barrel 76 is arranged within the cylinder or sleeve 68, to slide therein. This barrel is provided with a longitudinal duct 77, which for about the upper half of the barrel is coaxial therewith, this half of the duct being composed of two portions of different widths. The lower portion or half of the duct is eccentric, that is to say, is located to one side of the barrel axis, so as to provide room for a short longitudinal duct 78, which extends upwardly from the base of the barrel. The lower end of duct 77 is closed by a plug 98, while the lower end of duct 78 communicates with the interior of sleeve 68 through a port 99 provided at the lower end of the barrel. At different points of its length, duct 77 has ports 79, 80, and the duct 78 has a port 81. The ports 80, 79 open into annular grooves 82, 83 respectively, and the port 81 opens into a relatively wide annular groove 84 on the barrel 76. The three grooves 82, 83, and 84 are so spaced that sufficient surface of the barrel will contact with the cylinder or sleeve 68 to close or free ports 70 and 71 at the same time. The free vertical movement of barrel 76 is limited by a stop 85 projecting from sleeve 68 into a longitudinal groove 86 of the barrel. By means of this stop or pin 85, the barrel 76 and sleeve 68 will be compelled to move together after a predetermined relative displacement.

The upper part of sleeve 68 is widened interiorly at 87 sufficiently to permit the vertical movement therein, of the lower end of a pipe or sleeve 88 surrounding the reduced upper end of the barrel 76. This pipe 88 serves for conveying to the duct 77, liquid supplied through the flexible hose 89 one end of which is connected with the upper end of the pipe 88 (Fig. 1), while the other end of said hose 89 is connected, as shown in Fig. 7, with the outlet of casing 47, to receive liquid under pressure from either the pipe 45 or the pipe 46, as explained above.

The upper end of cylinder 62 is closed by means of a ring 90 having oil ducts 91. An annular projection of ring 90 and packing ring 93 enclose a packing chamber 92 surrounding cylinder 68, the lower end of said cylinder being surrounded with packing at 95. The upper end of barrel 76 has an aperture into which the duct 77 opens but this aperture is normally closed by a screw threaded plug 94, which also secures the pipe 88 to barrel 76.

The vertical displacement of barrel 76 and pipe 88 is controlled by a lever 100 (Figs. 1 and 5) a forked end 101 of which engages a pair of trunnions 96 projecting from the bent down portion of sleeve 88. The required oscillation of lever 100 may be brought about by any suitable means, and in the illustrated example is caused by an arm 102 keyed at 103 to one end of a rock shaft 104 carrying at its other end the lever 100. The shaft 104 is journaled in a suitable sleeve bearing 105, which in the illustrated example is located on the casing of a pressure control device which may form part of the installation; any suitable manually operated means may be provided for manually actuating the arm 102 and lever 100. For instance as shown in the drawings end of arm 102 is engaged by a pin 102ª (Fig. 5) projecting through the forked end 107 of a plunger 108. The left hand end of this plunger is reduced in diameter to form a shoulder 109 and said plunger 108 passes through a screw cap 110 into and through a bushing 111. The reduced end of the plunger is surrounded within the tubular bushing 111 by a piston 112 movable relatively to said plunger and adapted with its right hand end to engage the annular shoulder 109 of the plunger 108. A shoulder 113 formed near the right hand end of piston 112 serves as a seat for one end of a coiled spring 114, mounted within bushing 111 and surrounding the larger end of plunger 108, the other end of the spring 114 resting in a recess of cap 110. The movement of piston 112 in a left hand direction is limited by the shoulder 113 engaging a ring 115 which is seated against a shoulder formed by a narrowed portion 116 of the bushing 111, and co-operating with a screw cap 117, to securely hold the sleeve 118 in position. This sleeve forms a cylinder in which the piston 112 is slidably mounted, and is cut away in such a manner as to form a chamber 119 surrounding a portion of the piston 112 and communicating, by way of perforations 120 and 121, with packing compartments 122 and 123, respectively. The left hand end of piston 112 protrudes through an opening in cap 117.

The chamber 119 surrounding the piston 112 communicates with a reduced port 124 at the inner end of an axial duct provided in a threaded bolt-like member 125 screwed into a suitable opening of the sleeve 118. The other end of said duct has a radial port which opens into chamber 126 communicating with pipe 45. Through this channel oil under pressure will be delivered from port 39 and into the chamber 119 for the purpose of actuating the piston 112 against the resistance of the coiled spring 114. Obviously, instead of the coiled spring, other elastic means of suitable character may be provided for thus opposing the actuation of plunger 108 by piston 112 in the manner and for the purpose to be hereinafter set forth more in detail.

The left hand end of plunger 108 is connected, in any convenient manner, with the manually operated means such as a hand lever whereby the desired control is effected. When it is desired for instance to adjust the swashplate 31 in the direction of the arrow $a$ in Fig. 1, the operator exerts a pull toward the left upon the manually operated means to pivotally swing the arm 102 and lever 100; in the illustrated example this pull toward the left is transmitted to the plunger 108, which is thus also moved toward the left (Fig. 5) whereby the arm 102 will be swung in a contra-clockwise direction. Through the agency of shaft 104, the arm 100 also is swung in a contra-clockwise direction, and the trunnions 96 on the forked end 101 will be caused to lift the pipe or sleeve 88 and the barrel 76. After a short upward movement of the barrel 76, the shoulder at the lower end of groove 86 will engage the pin 85. At the same time port 70 will register with annular groove 82, and port 71 with annular groove 84. Oil under pressure will flow from pipe or hose 89 through duct 77, port 80, annular groove 82, port 70, into the chamber below piston 72. This oil will lift the piston 72 together with the sleeve 68, thereby assisting the effort which the operator exerts on the arm 101 and lever 100. Through the agency of control member or plunger 63, the tilting box 31' is rocked or swung in a contra-clockwise direction. When the arm 101 has reached the extreme left hand position, determined for instance, by any suitable arrangement of stops, the barrel 76 is arrested in its upward motion, in about the position shown in Fig. 1. Owing to the engagement of the lower shoulder of groove 86 with pin 85 and also to the admission of pressure oil into the chamber below piston 72, the sleeve 68 has moved upward together with the barrel 76, while the oil from the chamber above the piston 72 has been expelled through port 71, annular groove 84, port 81, duct 78 and duct 69 into the casing 27 of the pump. When the upward movement of the barrel 76 caused by the manual operation of the arm 101 and lever 100 stops, sleeve 68 continues to move upwardly, owing to the oil pressure below the piston 72, until the port 70 is shut off from the annular groove 82. The sleeve 68 and barrel 76 are then in the position shown in Fig. 1. At the end of the aforesaid operation, the operator shifts the rod 107 to the right to thereby swing the arm 102 and its associated elements in a clockwise direction, thereby forcing barrel 76 downwardly, in which movement it will carry along the sleeve 68, in the same manner as during the upward movement. Fig. 2 illustrates the position at the moment that barrel 76 and sleeve 68 begin to move downwardly in unison after barrel 76 has move from the position Fig. 1 to the position Fig. 2. It will be seen that pressure oil from hose 89 will now be admitted to the chamber above piston 72, forcing the latter down. As will be seen clearly from Figs. 1 to 3, sleeve 68 will follow the movement of the barrel 76, and when the latter is stopped, the sleeve 68 will always assume the same position relatively thereto, as shown in Figs. 1 and 3, in which position pin 85 is in the center of groove 86, and ports 70 and 71 are out of communication with the annular grooves 82, 83, and 84.

It will also be apparent that the manual effort exerted by the operator on the arm 101 and lever 100 need only be great enough to move the barrel 76 alone, while the pressure oil, admitted from hose 89, will move the sleeve 68, plunger 63, and tilting box 31', swinging the latter on its axis. The pin 85 merely prevents the barrel 76 from moving faster than the sleeve 68, thereby insuring the proper registry of the ports 71 and 70 with the annular grooves 83 and 84 respectively when the parts are moving downwardly, and the registry of the ports 70 and 71 with the grooves 82 and 84 respectively when the parts are moving in an upward direction.

When the barrel 76 and the sleeve 68 pass through the position which corresponds to the vertical or neutral position of the swashplate 31, the oil from pipe or hose 89 will, for a moment, cease to be under pressure, since at that time the pump is neither sucking nor delivering oil; thus, if oil pressure alone were relied upon to move the piston 72, the movement of said piston and of the sleeve 68 would cease under the special circumstances just referred to. However, as pin 85 is in engagement with either the upper or the lower shoulder of groove 86, depending on the direction in which the parts are moving, the sleeve 68 and piston 72 are carried along past this "dead point", by the manual operation of the arm 101 and pressure oil will again be forced through the hose 89, since the tilting of the swashplate from the neutral position will cause the pump to resume its liquid-propelling action. Oil coming from the pressure port 39 of the pump will pass through pipe 45 and casing 47 (Fig. 7) into hose 89. The oil pressure will force the ball valve 48 away from the opening at the end of pipe 45 into the casing 47, and against the corresponding opening or seat at the end of pipe 46.

As a further result of such operation of the oil pump, oil under pressure will flow from the delivery port 39 through pipe 25 to the co-operating motor or B-end or equivalent mechanism.

During the same time, due to the suction exerted at port 40, oil is sucked through pipe 26 back to the cylinders of the pump or A-end 27.

Sufficient oil is stored in a suitable storage reservoir to insure that during the operation of the machine all chambers and other spaces be filled with oil. To insure this, a permanently open connection is provided between the reservoir and the pump casing 27 for instance through a pipe 43.

While the operation of the mechanism is thus being performed, oil under pressure delivered through port 39 into pipe 45 will find a branch outlet through chamber 126 (Figs. 5 and 6), perforated member 125, port 124 and into the substantially annular chamber 119. The tension of coiled spring 114 is so adjusted that, in case the hydraulic pressure exerted by the oil in chamber 119 on piston 112 is below a predetermined maximum, such pressure cannot overcome that exerted in the opposite direction by the spring, and the piston 112 will be held in the position illustrated in Fig. 5, leaving the operation of the machine unaffected.

If, however, due to an obstacle encountered by the mechanism, or to the speeding up of the pump, or to any other cause, oil at a pressure above a predetermined maximum should be delivered through port 39, then the resistance of spring 114 will be overcome, and the oil in chamber 119 will force the piston 112 from left to right. By engaging the annular shoulder 109, the piston will force the plunger 108 to the right, and this will result in a reduction of the flow of oil, in the following manner:

The plunger 108 when moved to the right, will cause the arm 102, shaft 104, and lever 100 to move in a clockwise direction. Through the agency of the trunnions 96, the forked end 101 of the lever 100 will cause pipe 88 and barrel 76 to slide downward within the sleeve 68. After a slight movement of the barrel, the annular groove 83 will be in registry with the port 71, whereby oil under pressure will be delivered from hose 89, through duct 77, port 79, groove 83, port 71, and into the annular chamber above the ring-shaped piston 72. Under the influence of the pressure of the oil in this chamber, the piston 72 will move downward, the oil in the annular chamber below this piston being forced out through the port 70 which at that time registers with the groove 84, and then through port 81, duct 78, port 99, and chamber 69 into the pump casing 27. The piston 72 in its downward movement will take along the sleeve 68 and plunger 63, causing the tilting box 31' to swing on the axis 33 in a clockwise direction, which, as stated above, will result in reducing the pump output, that is, in reducing the flow of oil.

The downward movement of the barrel 76 with respect to the casing 68 may continue until the stop 85 engages the upper periphery of the groove 86 (Fig. 2) in which position the ports 70 and 71 are entirely exposed to the grooves 84 and 83, respectively. From this point on, if the pressure continues to be exerted on the barrel 76, the latter will continue its downward movement, but the relative positions of the barrel and casing 68 will remain the same as illustrated in Fig. 2. This may continue until the swashplate reaches its vertical position whereupon the pump will cease to circulate oil.

Due to the reduction of the flow in the oil supply system caused by the tilting of plate 31, i. e. the varying of the piston stroke, the pressure in chamber 119 will be overcome by the resistance of spring 114 and the latter will return the piston 112 to its normal position. The operator may learn of the existance of an excessive pressure by reading a suitable gauge which may be provided and also from the movement of the aforesaid hand lever in a counter clockwise direction caused by the plunger 108.

As soon as conditions warrant it, the operator returns the manually operated means in position to cause, in the above described manner, the lifting of barrel 76. When the relative positions of the barrel and casing 68 are such that the port 70 communicates with the groove 82 then oil under pressure will be delivered from pipe 89, through duct 77, port 80, groove 82, port 70, and into the chamber below piston 72. This will cause the upward movement of the piston, the oil in the upper chamber being forced out through port 71, groove 84, port 81, duct 78, port 99, and duct 69 into the casing 27. The piston 72 will move the casing 68 and plunger 63 in an upward direction, whereupon the tilting box 31' will be returned towards the position illustrated in the drawings. The relative displacement in the upward direction of barrel 76 and casing 68 is again limited by the stop 85 which, by engaging the lower periphery of groove 86 will insure the proper circulation of oil to cause the upward movement of piston 72. When the barrel 76 reaches the limit of its upward movement, the casing 68 will continue its movement under the control of piston 72 until the port 70 is closed and the parts assume the positions shown in Fig. 1. The operation may now continue in the above described manner.

When, upon the completion of any given operation, the operator desires to reset the machine, he moves the operating means for the arm 102 and lever 100 in a clockwise direction. Through the agency of said arm 102 and lever 100, the barrel 76 will be pressed downward in the above described manner until the pump control mechanism assumes the position shown in Fig. 3. The swashplate 31 is now in the other extreme position than the one illustrated in the drawings, and the pump will draw in at 39 and force oil through 40. Oil will therefore flow from the said pump through port 40 and pipe 26, or in other words the functions of the ports 39 and 40 will be reversed.

During this time the pump control mechanism remains in the position shown in Fig. 3. When the operator is ready for the next operation he may again swing the arm 102 to the left, thus lifting the barrel 76 sufficiently to permit the introduction of oil under pressure through groove 82 and port 70 into the chamber below piston 72, whereupon the mechanism will be returned into the position shown in Fig. 1 in the above described manner.

From the above it will be clear that the novel arrangement, in its broadest sense, comprises a pressure operated means, exemplified by the cylinder 62 and its associated elements, which serves to augment the manual actuation of the manually operated means exemplified by the arm 102 and lever 100, and transmit the controlling operations thereof, in an augmented degree, to the swashplate 31 or its equivalent. Any resistance developed against the adjustment of such swashplate 31 or its equivalent, because of the large size thereof or because of other reasons, is thus apparently overcome without difficulty and with a minimum of manual effort on the part of the operator.

It will be obvious to those skilled in the art that the mechanism herein disclosed may be adapted to a wide variety of uses, and that the details thereof may be varied within wide limits without departing from the spirit of the invention as defined in the appended claims.

I claim:

1. A controlling device comprising a control member, a control piston, chambers on opposite sides of said piston, means for passing fluid under pressure into one of said chambers and for exhausting fluid from the other chamber, means for passing fluid under pressure into said other chamber and for exhausting from said one of said chambers, a plunger capable of independent manual operation for manually controlling the operation of said control piston; a second piston loosely mounted on said plunger, resilient means effective upon said second piston and exerting a predetermined pressure thereon to maintain said second piston in and return it to its normal position, and a pressure fluid connection leading to a point behind said second piston, the latter being actuated to automatically operate said plunger in opposition to said resilient means when the pressure in said pressure fluid connection exceeds the predetermined pressure of said resilient means.

2. A controlling device comprising controlling means, a plunger capable of independent manual operation connected with said controlling means for manually operating the same, a normally inactive piston loosely mounted on said plunger, a device on said plunger arranged to be engaged by said piston, pressure developing means effective upon said piston and exerting a predetermined pressure thereon to maintain said piston in its normal position out of contact with said device and to return it to said position, and a pressure connection leading to a point behind said piston, the latter being shifted into engagement with said device and operated when the pressure in said pressure connection exceeds the predetermined pressure of said pressure developing means whereby said plunger is automatically actuated to operate said controlling means.

3. A controlling device comprising controlling means, a plunger capable of independent manual operation connected with said controlling means for manually operating the same, a normally inactive piston loosely mounted on said plunger, a device on said plunger arranged to be engaged by said piston, a coiled spring effective upon said piston and exerting a predetermined pressure thereon to maintain said piston in its normal position out of contact with said device and to return it to said position, and a pressure connection leading to a point behind said piston, the latter being shifted into engagement with said device and operated when the pressure in said pressure connection exceeds the predetermined pressure of said spring whereby said plunger is automatically actuated to operate said controlling means.

4. A controlling device comprising controlling means, a plunger capable of independent manual operation connected with said controlling means for manually operating the same, a stationary sleeve surrounding a portion of said plunger and provided with a chamber, an annular shoulder on said plunger beyond one end of said sleeve, a tubular piston movable in the chamber of said sleeve and loosely mounted on said plunger, a coiled spring effective upon said piston and exerting a predetermined pressure thereon to maintain said piston in its normal position out of engagement with said annular shoulder, and a pressure connection leading to said chamber at a point behind said piston, the latter being shifted into engagement with said annular shoulder and operated when the pressure in said pressure connection exceeds the predetermined pressure of said spring whereby said plunger is automatically actuated to operate said controlling means.

JOHN ROBSON.